United States Patent
Goring et al.

(10) Patent No.: US 7,894,431 B2
(45) Date of Patent: Feb. 22, 2011

(54) SYSTEM AND METHOD FOR COMMUNICATING ASYNCHRONOUSLY WITH WEB SERVICES USING MESSAGE SET DEFINITIONS

(75) Inventors: Bryan R. Goring, Milton (CA); Michael Shenfield, Richmond Hill (CA); Igor Tsenter, Woodbridge (CA)

(73) Assignee: Research In Motion Limited, Waterloo (CA)

( * ) Notice: Subject to any disclaimer, the term of this patent is extended or adjusted under 35 U.S.C. 154(b) by 893 days.

(21) Appl. No.: 11/065,030

(22) Filed: Feb. 25, 2005

(65) Prior Publication Data

US 2006/0023674 A1      Feb. 2, 2006

Related U.S. Application Data

(60) Provisional application No. 60/548,096, filed on Feb. 27, 2004.

(51) Int. Cl.
*H04L 12/28*      (2006.01)
*H04L 12/56*      (2006.01)
(52) U.S. Cl. .................................................... 370/392
(58) Field of Classification Search ........................ None
See application file for complete search history.

(56) References Cited

U.S. PATENT DOCUMENTS 6,035,324 A      3/2000      Chang (Continued)

FOREIGN PATENT DOCUMENTS

GB      2313524      11/1997

(Continued)

OTHER PUBLICATIONS

Chang, H et al., "Web Browsing in a Wireless Environment: Disconnected and Asynchronous Operation in ARTour Web Express", Proceedings of the Third Annual ACM/IEEE International Conference on Mobile Computing and Networking, MOBICOM 97, p. 260-269, Sep. 26-30, 1997, Budapest, Hungary.

(Continued)

*Primary Examiner*—Salman Ahmed
*Assistant Examiner*—Blanche Wong

(57) ABSTRACT

Described herein are a system, method, and computer readable medium for correlating asynchronous communication messages between a mobile communication device and a data source over a network. The mobile communication device executes an application to provide interaction with the data source based on the content of the communication messages. The system includes a message set and a message manager. The message set is configured to correlate an asynchronous request message of the communication messages with a corresponding asynchronous response message of the communication messages. The asynchronous request message has a first correlation identifier when transmitted and the asynchronous response message has a second correlation identifier when received; the first and second correlation identifiers form part of the message set and specify a mapping that correlates a data element of the asynchronous request message and a data element of the asynchronous response message, respectively, with a data instance. The first correlation identifier is different from the second correlation identifier. The message manager is configured to map the data element of the asynchronous response message to the element of the data instance by resolving the data instance using the second correlation identifier, and by updating the element of the data instance with the data element of the asynchronous response message according to the mapping specified in the message set.

21 Claims, 8 Drawing Sheets

U.S. PATENT DOCUMENTS

| | | | |
|---|---|---|---|
| 6,336,135 | B1 | 1/2002 | Niblett |
| 6,584,321 | B1* | 6/2003 | Coan et al. .................. 455/466 |
| 6,591,310 | B1 | 7/2003 | Johnson |
| 6,721,288 | B1* | 4/2004 | King et al. .................. 370/310 |
| 6,867,789 | B1* | 3/2005 | Allen et al. ................. 715/744 |
| 7,334,220 | B2* | 2/2008 | Chang et al. ................ 717/126 |
| 7,363,342 | B1* | 4/2008 | Wang et al. ................. 709/204 |
| 2002/0023127 | A1 | 2/2002 | Sabeti |
| 2002/0087507 | A1 | 7/2002 | Hopewell et al. |
| 2003/0065709 | A1 | 4/2003 | Jordan et al. |
| 2003/0206192 | A1 | 11/2003 | Chen |
| 2004/0039460 | A1 | 2/2004 | Kaputin |
| 2004/0249950 | A1* | 12/2004 | Christensen et al. ........ 709/227 |
| 2004/0255046 | A1 | 12/2004 | Ringseth |
| 2005/0015643 | A1* | 1/2005 | Davis et al. .................... 714/4 |
| 2005/0063335 | A1* | 3/2005 | Shenfield et al. ............ 370/329 |
| 2005/0154785 | A1* | 7/2005 | Reed et al. .................. 709/217 |
| 2005/0188420 | A1* | 8/2005 | Benantar et al. ............... 726/3 |
| 2005/0193380 | A1* | 9/2005 | Vitanov et al. .............. 717/143 |

FOREIGN PATENT DOCUMENTS

| | | |
|---|---|---|
| GB | 2381409 | 4/2003 |
| WO | WO99/01960 | 1/1999 |
| WO | WO03/077139 | 9/2003 |
| WO | WO 2004/066081 | 8/2004 |

OTHER PUBLICATIONS

Floyd, R. and Housel, B., "Mobile Web Access Using eNetwork Web Express", IEEE Personal Communications, IEEE, vol. 5, Issue 5, p. 47-52, Oct. 1998.

Decision to grant a European patent pursuant to Article 97(1) EPC for EP 1719288, Apr. 3, 2008, European Patent Office.

European Examination Report for EP 1719288 (Application No. 05714528.6-2416), 3 pages, Jun. 5, 2007, European Patent Office.

Supplementary European Search Report for EP 1719288 (Application No. 05714528.6-2416), 3 pages, Apr. 10, 2007, European Patent Office.

Decision to grant European patent pursuant to Article 97(1) EPC for EP 1735947, May 23, 2008, European Patent Office.

European Examination Report for EP 1735947 (Application No. 05714529.4-2416), 9 pages, Jun. 18, 2007, European Patent Office.

Supplementary European Search Report for EP 1735947 (Application No. 05714529.4-2416), 3 pages, Apr. 10, 2007, European Patent Office.

Office Action for corresponding U.S. Appl. No. 11/255,873 mailed Jul. 1, 2008, United States Patent Office.

Office Action for corresponding U.S. Appl. No. 11/255,873 mailed Jan. 15, 2009, United States Patent Office.

Office Action for corresponding U.S. Appl. No. 11/255,873 mailed Jun. 8, 2009, United States Patent Office.

Office Action for corresponding U.S. Appl. No. 11/255,873 mailed Dec. 8, 2009, United States Patent Office.

"PCT Notification of Transmittal of the International Search Report and the Written Opinion of the International Searching Authority, or the Declaration" for PCT International Patent Application No. PCT/CA2005/000286, Jul. 5, 2005, 11 pages, International Searching Authority.

Office Action for CA Application No. 2,557,145 mailed Jul. 19, 2010. Canadian Intellectual Property Office.

Office Action for U.S. Appl. No. 11/255,873 mailed Aug. 3, 2010, United States Patent Office.

International Preliminary Report on Patentability for PCT/CA2005/000287, issued Mar. 2006, Patent Cooperation Treaty.

Notice of Allowance for US Application 11/255,873 mailed Dec. 23, 2010, United States Patent Office.

* cited by examiner

SYSTEM AND METHOD FOR COMMUNICATING ASYNCHRONOUSLY WITH WEB SERVICES USING MESSAGE SET DEFINITIONS

This application claims the benefit of priority for U.S. provisional application No. 60/548,096, filed Feb. 27, 2004, herein incorporated by reference.

BACKGROUND

This application relates generally to wireless communication and specifically to network messaging for mobile communication devices.

There is a continually increasing number of mobile communication devices in use today, such as mobile telephones, PDAs with wireless communication capabilities, and two-way pagers. Software applications which run on these mobile communication devices increase their utility. For example, a mobile phone may include an application which retrieves the weather for a range of cities, or a PDA may include an application that allows a user to shop for groceries. These software applications take advantage of the mobility of these devices and connectivity to a wireless network in order to provide timely and useful services to users, regardless of where the users are. However, due to the restricted resources of mobile communications devices, and the complexity of delivering data wirelessly to a mobile communication device, developing software applications for mobile communications devices remains a difficult and time-consuming task.

Web Services are emerging as the de-facto mechanism to allow disjoint parties to collaborate on the Internet. Web services allow businesses and other parties to collaborate in a universal, platform and language neutral way and promise to overcome traditional barriers encountered in linking numerous and diverse information systems. Web services are still in their relative infancy, with many technology players cooperating to define the emerging standards, and corporations beginning to throw their weight behind the thrust to link disparate systems over the web using this standard approach. A common model employed in web service offerings is the traditional synchronous request-response type interaction whereby the consumer of the service passes some information and receives something in response. In this scenario the user of the device requests or "pulls" the content from the network. In other words, the content is constantly present in the network, but the user needs to issue a retrieval request to access the information (e.g. using a browser on the mobile device).

In real-life applications there is a lot of information that is available to a user but hardly accessible, as the user doesn't know when the information is posted or when there is a change in the status of the posted content. Such information ideally needs to be "pushed" to the user either periodically or when certain predefined events occur. Some examples of possible push situations are unrequested arrival of new e-mail, stock market information, multi-user game updates, etc. This ability to push information spontaneously implies an asynchronous messaging framework. From a practical point of view, wireless communications have higher cost than wired communications and usually are characterized by higher latency times, making a 'pull' from a wireless device inherently expensive. Slow connection times sometimes might be critical to the user's experience. Push technology can be wireless friendly. Its users can benefit in a number of ways: push technology can make useful data instantly available, can improve user perception of the wireless network; can make data delivery cost effective (since the device does not have to repeatedly poll for data); and can extend battery life.

Wireless push would involve a server that, given a user's specific one-time request to be notified with specific data on predefined conditions, would send this data to the user's device as soon as the data is available and/or the conditions have been met. The communication protocol and user/device addressing are device-specific and the server must be aware of them. Web Services have become a ubiquitous standard for access to content resources as well as communicating to back-end servers. Their number and complexity have increased considerably in recent years. However, invoking Web Service operations from a wireless device using the synchronous communication method exclusively can be expensive and impractical.

SUMMARY OF THE INVENTION

Systems and methods disclosed herein provide a correlated asynchronous messaging environment to obviate or mitigate at least some of the above presented disadvantages.

Wireless push would involve a server that, given a user's specific one time request to be notified with specific data on predefined conditions, would send this data to the user's device as soon as the data is available and/or the conditions have been met. The communication protocol and user/device addressing are device-specific and the server must be aware of them. Web Services have become a ubiquitous standard for access to content resources as well as communicating to back-end servers. Their number and complexity have increased considerably in recent years. However, invoking Web Service operations from a wireless device using the synchronous communication method exclusively can be expensive and impractical. Contrary to current systems and methods there is provided a system, method, and computer readable medium for correlating asynchronous communication messages between a mobile communication device and a data source over a network.

There is provided a system for correlating asynchronous communication messages between a mobile communication device and a data source over a network, the mobile communication device for executing an application to provide interaction with the data source based on content of the communication messages. The system includes a message set configured to correlate an asynchronous request message of the communication messages with a corresponding asynchronous response message of the communication messages, the asynchronous request message including a first correlation identifier when transmitted and the asynchronous response message including a second correlation identifier when received, the first and second correlation identifiers forming part of the message set and specifying a mapping that correlates a data element of the asynchronous request message and a data element of the asynchronous response message, respectively, with an element of a data instance; and a message manager configured to map the data element of the asynchronous response message to the element of the data instance by resolving the data instance using the second correlation identifier, and by updating the element of the data instance with the data element of the asynchronous response message according to the mapping specified in the message set. The first correlation identifier is different from the second correlation identifier.

There is further provided a method for correlating asynchronous communication messages between a mobile communication device and a data source over a network, the mobile communication device for executing an application to provide interaction with the data source based on content of the communication messages. The method includes sending an asynchronous request message of the communication messages, the asynchronous request message including a first correlation identifier when transmitted; receiving an asynchronous response message of the communication messages, the asynchronous response message including a second correlation identifier when received; correlating the asynchronous request message with the asynchronous response message by employing a message set, the first and second correlation identifiers forming part of the message set and specifying a mapping that correlates a data element of the asynchronous request message and a data element of the asynchronous response message, respectively, with an element of a data instance; and mapping the data element of the asynchronous response message to the element of the data instance by resolving the data instance using the second correlation identifier, and by updating the element of the data instance with the data element of the asynchronous response message according to the mapping specified in the message set. The first correlation identifier is different from the second correlation identifier.

There is further provided a computer readable medium storing a computer program for correlating asynchronous communication messages between a mobile communication device and a data source over a network, the mobile communication device for executing an application to provide interaction with the data source based on content of the communication messages. The computer readable medium includes a message set module stored on the medium and configured to correlate an asynchronous request message of the communication messages with a corresponding asynchronous response message of the communication messages, the asynchronous request message including a first correlation identifier when transmitted and the asynchronous response message including a second correlation identifier when received, the first and second correlation identifiers forming part of the message set and specifying a mapping that correlates a data element of the asynchronous request message and a data element of the asynchronous response message, respectively, with an element of a data instance; and a message manager module configured to map the data element of the asynchronous response message to the element of the data instance by resolving the data instance using the second correlation identifier, and by updating the element of the data instance with the data element of the asynchronous response message according to the mapping specified in the message set. The first correlation identifier is different from the second correlation identifier.

BRIEF DESCRIPTION OF THE DRAWINGS

These and other features will become more apparent of embodiments of the present invention in the following detailed description, in which reference is made to the appended drawings by way of example wherein.

DESCRIPTION

Network System

Figure 1:
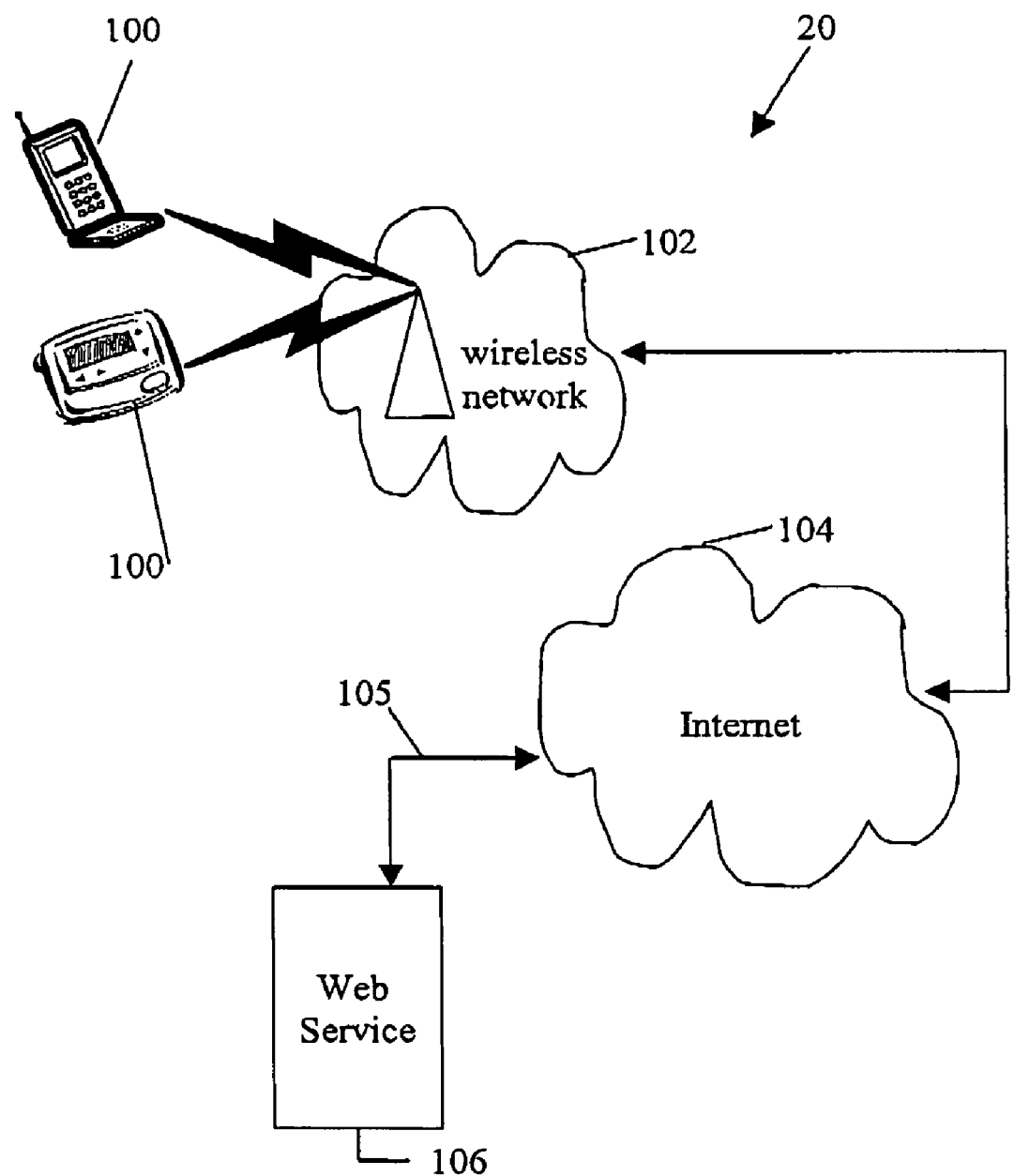
FIG. 1 is a block diagram of a communication system.

Referring to FIG. 1, a network system 20 comprises mobile communication devices 100 for interacting with one or sore web services 106 provided via a coupled wireless network 102 and the Internet 104. The devices 100 transmit and receive requests/response messages 105, respectively, when in communication with the web services 106. The devices 100 can operate as web clients of the web services 106 by using the requests/response messages 105 in the form of message header information and associated data content, for example requesting and receiving product pricing and availability from an on-line merchant. The web service 106 is an example of a system with which client application programs 302 (see FIG. 2) on the communication devices 100 interact via the wireless network 102 and the Internet 104 in order to provide utility to users of the communication devices 100. The messages 105 sent between the communication devices 100 and the web service 106 could traverse a message-map service (not shown) which converts the messages 105 between the differing formats used by the devices 100 and the web service 106.

For satisfying the appropriate requests/response messages 105, the web service 106 could communicate with the devices 100 through various protocols (such as but not limited to HTTP and component API) for exposing relevant business logic (methods) to client application programs 302 (see FIG. 2) once provisioned on the devices 100. The application programs 302 of the devices 100 can use the business logic of the web service 106 similarly to calling a method on an object (or a function). It is recognized that the client application program 302 can be downloaded/uploaded in relation to the web service 106, through the messages 105 via the network 102, 104, directly to the devices 100. It is further recognized that the devices 100 can communicate with one or more web services 106 via the networks 102, 104.

Server Environment

Referring to FIG. 1, the web service 106 provides information messages 105 which are used by the client application programs 302 on the communication devices 100. Alternatively, or in addition, the web service 106 may receive and use the information messages 105 provided by the client application programs 302 executed on the communication devices 100, or perform tasks on behalf of client application programs 302 executed on the communication devices 100. The web service 106 can be defined as a software service, which can implement an interface expressed using Web Services Description Language (WSDL) registered in Universal Discovery Description and Integration (UDDI), for example, and can communicate through messages 105 with client devices 100 by being exposed over the Internet 104 through an appropriate protocol such as the Simple Object Access Protocol (SOAP), for example. In some implementations, SOAP is a specification that defines the XML format for the messages 105, including a well-formed XML fragment enclosed in SOAP elements. Other parts of SOAP specify how to represent program data as XML and how to use SOAP to do Remote Procedure Calls (RPC). These optional parts of SOAP are used to implement RPC-style applications where a SOAP request message 105 containing a callable function, and the parameters to pass to the function, is sent from the client device 100, and the service 106 returns the response message 105 with the results of the executed function. SOAP also supports document style applications where the SOAP message 105 is a wrapper around an XML document. A further optional part of SOAP defines the HTTP binding (e.g. header), whereas some SOAP implementations support MSMQ, MQ Series, SMTP, or TCP/IP transport protocols. Alternatively, the web service 106 may use other known communication protocols, message 105 formats, and the interface may be expressed in other web services 106 languages than described above. Accordingly, the services supplied by the web service 106 are utilized by the user of the devices 100 over the network 102, 104.

Client Environment

Figure 2:
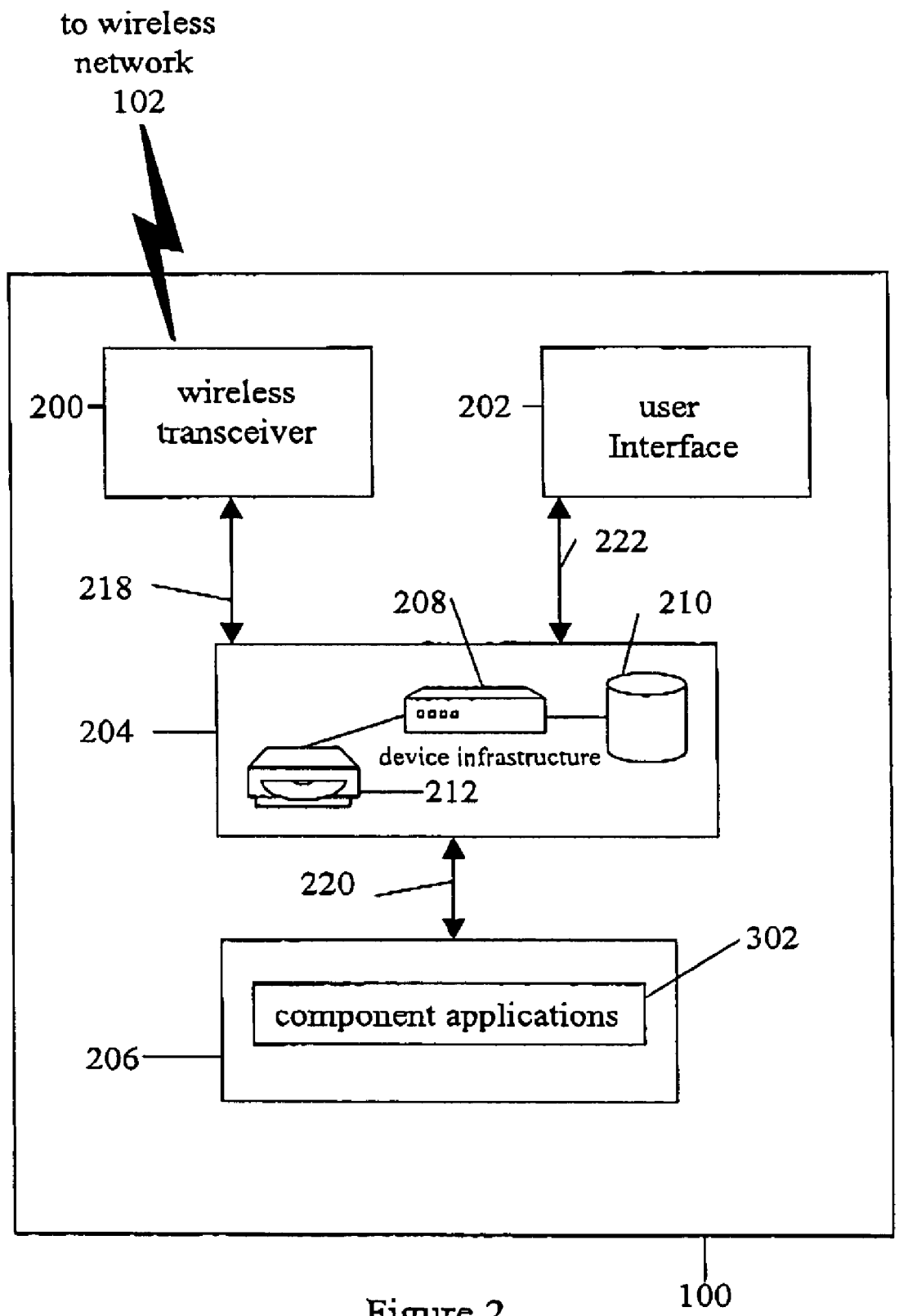
FIG. 2 is a block diagram of a mobile communication device of FIG. 1.
Figure 3:
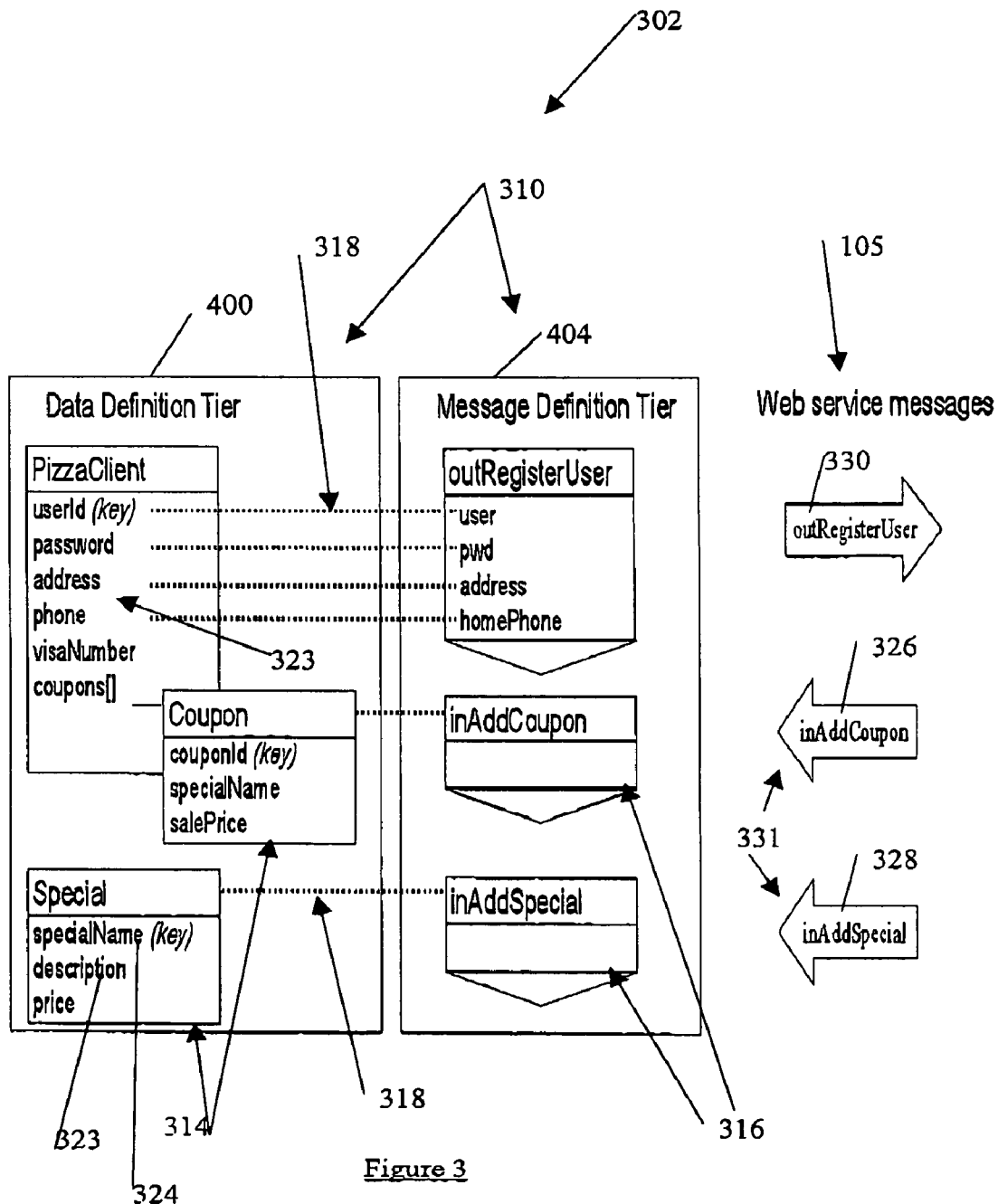
FIG. 3 is an asynchronous messaging and data relationship example of the web service of FIG. 1.

Referring to FIGS. 2 and 3, the applications 302 are software applications which can be written, for example, in eXtensible Markup Language (XML) and a subset of ECMAScript. An example application 302 is described in detail, for completeness purposes, with reference to FIG. 10 in the Application Program 302 section found at the end of this Description Section. XML and ECMAScript are standards-based languages which allow software developers to develop the applications 302 in a portable and platform-independent way. The applications 302 can be transmitted over-the-air via the wireless network 102 and loaded into a memory module 210 of a device infrastructure 204. Alternatively, the applications 302 may be loaded via a serial connection, a USB connection, or a short-range wireless communication system such as IR, 802.11(x) and/or Bluetooth™ onto the device 100. Once loaded onto the mobile communication device 100, the applications 302 are executed by a framework 206 on the mobile communication device 100, which converts applications 302 into native code which is executed by the processor in the device infrastructure 204. Alternatively, the applications 302 may be executed as native code or interpreted by another software module or operating system on the mobile communication device 100, which provides the framework 206 as a native runtime environment, hereafter referred to generically by reference numeral 206.

Referring again to FIG. 3, the applications 302 are organised as multiple tier/layer 310 applications 302, such as but not limited to a messaging layer 404 and a data layer 400. It is recognised that the application 302 can contain other layers 310, such as but not limited to a presentation layer 402 and a workflow layer 406, as further explained below with reference to FIG. 10. The application 302 is configured to have a set of data definitions 314 in the data layer 400, a set of asynchronous message definitions 316 in the message layer 404 and mappings 318 that specify how the message definitions 316 are related to the underlying data definitions 314. In general, it is recognised that the application definitions 314, 316 (including definitions 320,322—see FIG. 10) of the respective layers 310 can be expressed in a structured definition language such as but not limited to XML.

Data Components 400 can be defined as application 302 data represented in native code or XML, or other structured definition language. Message Components 402 can be defined as messaging data represented in native code or XML, or other structured definition language. Message components 402 may define mapping relationships to Data Components 400 that specify their definition, or how underlying data is affected through transmission or reception of the messages 330,331a,331b. The Device Runtime or framework 206 can be defined as the software that hosts and evaluates the application 302. The Device Runtime 206 provides services to manage data associated to the application 302, provides capability for asynchronous incoming 331b and outgoing messages 330 generated by the application 302, and manages relationships between messages and data. Message Mapping can be defined as a relationship existing between data 400 and message 402 components that specifies partial or complete definition of the message based on a data mapping, and how messaging interactions affect the underlying data.

Generally the data definitions 314 are distinguished as having a set of sub-elements 323 (or fields), and define a key field or identifier 324 by which the mapping 318 (from the corresponding message definition 316) to the associated data element 323 may be resolved. Messages 105 derived from the message definitions 316 can define a set of fields but may not specify key fields, which is implemented through mappings 318. The messages 105 are typically short lived; are consumed and then discarded, whereas data elements 323 corresponding to the data definitions 314 are long lived and may be restored at any time from the persistent storage 210 (see FIG. 2) by providing the appropriate key field value 324 by the storage service (not shown) of the device runtime 206. The messages 105, either synchronous-based or asynchronous-based, represent interactions with entities (i.e. web-services 106) outside of the Device Runtime 206 and these messages 105 are typically not correlated by the web services 106 themselves. The messages 105 may be defined as originating (i.e. out message 105) from the device runtime 206 and targeted to the external web service 106, or may be transmitted (i.e. in message 105) to the device runtime 206.

Further, message definitions 316 may define relationships to data elements 323 called mappings 318 that determine how origination or reception of the related message 105 affects the related data element 323, as for example defined by the data definition 314 of the data layer 400. This mapping 318 relation is uniquely identified by the key field 324 mapping 318 that may be determined as follows, such as but not limited to:

the mapping 318 is made directly to the data definition 314: the message 105 takes its complete definition from the data definition 314 such that the data element key field 324 value is extracted from identical message definition 316 field element (generally referred to hereafter as message mapping 318 wherein all fields of the message 105 correspond to all fields of the data definition 314); and the mapping 318 is from a field of the message definition 316 to a field of the data definition 314: the message 105 partially defines itself such that the data element key field 324 value is extracted from mapped message field (generally referred to hereafter as field mapping 318 wherein selected fields of the data definition 314 are mapped 318 to selected fields of the message definition 316).

As an example, referring to FIG. 3, consider an asynchronous web service 106 (see FIG. 1) that models a pizza parlour. This web service 106 exposes the capability to register the wireless device 100 as a PizzaClient application 302 (see FIG. 2) and may synchronously deliver the user an asynchronous response message 331, e.g. a Coupon message 326 or a Special message 328, to the wireless application 302 running on the runtime environment 206 of the device 100. The set of corresponding data elements 323 and asynchronous response messages 331 to interact with the web service 106 are depicted in FIG. 3, which illustrates the PizzaClient data elements 323 and message field level mappings 318 to the outRegisterUser outgoing request message 330. The PizzaClient application 302 may contain none or more Coupon data elements 323 which are message mapped 318 directly to the in AddCoupon incoming message 326. Finally the Special data element 323 is message mapped 318 directly to the in AddSpecial incoming message 328. It is noted that the in AddCoupon 326 and in AddSpecial 328 are asynchronous messages 331, such that each arriving message 326,328 identifies its own key field (from mapping 318) that affects the underlying data element 323. For example, once the messages 326,328 are received by the application 302, the persistence service (e.g. data manager) of the device 100 may create a new data element or update an existing data element resident in the storage 210 (see FIG. 2).

Figure 4:
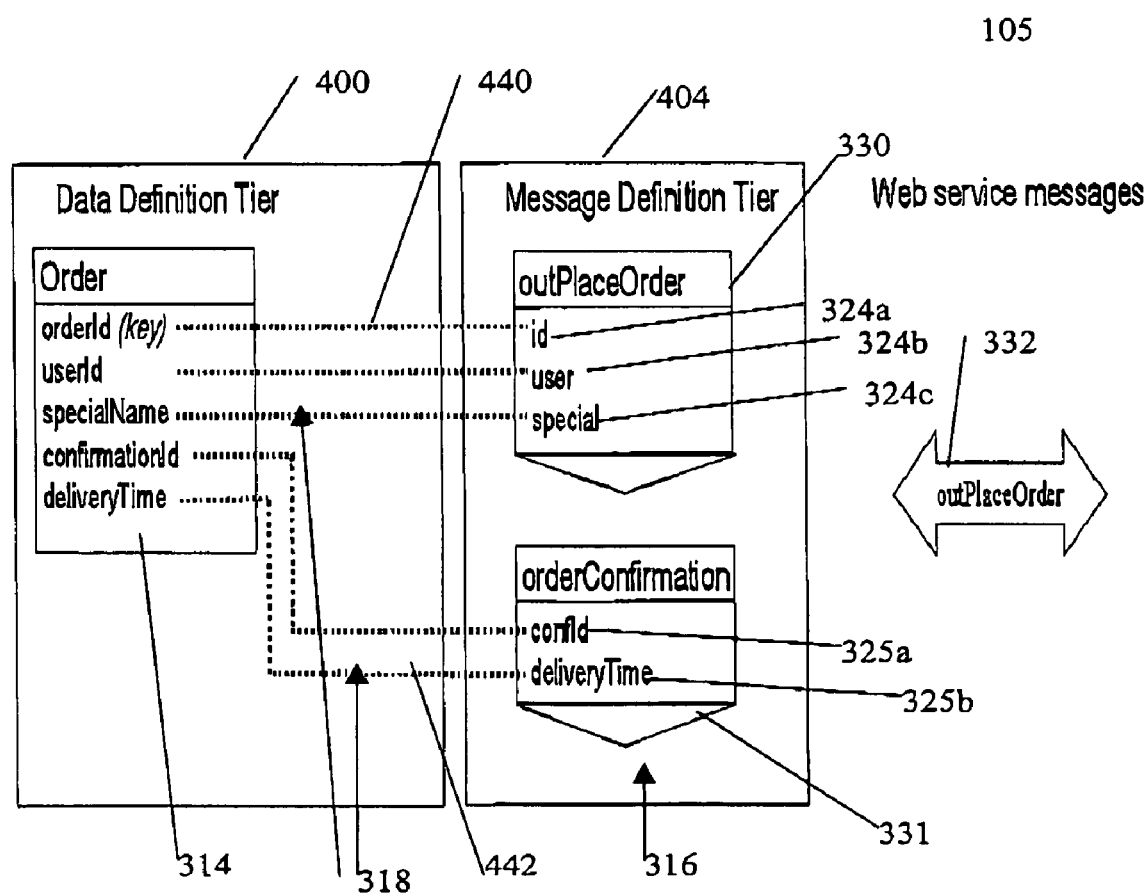
FIG. 4 is an example synchronous operation of the web service of FIG. 3.

Further, referring to FIG. 4, suppose that the Pizza Shop now wants to extend their web service 106 by allowing the user of the device 100 to order a pizza. The web service 106 can be enhanced to provide a synchronous message operation 332 that accepts some order criteria and returns order confirmation and delivery time. The order request is distinguished by an order id (this becomes the data key 324 preferably a unique identifier), and the order confirmation id 325 is associated with uncorrelated data from the web service 106 describing the success of the order. Correlation of the return data from the Web Service's 106 perspective is achieved by the synchronous request-response nature of the submission operation 332. However correlation of the returned data within the framework of the asynchronous messaging model (see FIG. 3) of the device runtime environment 206 is not immediately apparent, due to the fact that the order confirmation data returned by the web service 106 is uncorrelated to the request by any key 324 information, which if included would tie the result to the original order data element. As depicted in FIG. 4, two asynchronous message definitions 316 are used to generate corresponding messages 105 to handle the order placement (outPlaceOrder) and reception of order confirmation (orderConfirmation). The mediator 500 (see FIG. 5) is used to help link the order confirmation information directly to the originating Order data element, as further described below.

Referring again to FIGS. 1 and 2, the client runtime environment 206 provided by the devices 100 can be configured to make the devices 100 operate as web clients of the web services 106. The client runtime environment 206 of the devices 100 is preferably capable of generating, hosting and executing the client application programs 302 (which are in the form of tiered/layered 310 applications—see FIG. 3) on the device 100. Further, specific functions of the client runtime environment 206 can include such as but not limited to support for language, coordinating memory allocation, networking, management of data during I/O operations, coordinating graphics on an output device of the devices 100 and providing access to core object oriented classes and supporting files/libraries.

The terminal runtime environment 206 of the devices 100 preferably supports the following basic functions for the resident executable versions of the client application programs 302, such as but not limited to:

provide a communications capability to send the messages 105 to the Web Services 106 connected via the network 102, 104;

provide data input capabilities by the user on the input interface 202 (see FIG. 2) of the devices 100 to supply data parts for Web Services' outgoing messages 105 (messages to the service 106);

provide data presentation or output capabilities for Web Services' response messages 105 (incoming messages) or uncorrelated notifications of the web service 106 on the output interface 202;

provide data storage services to maintain local client data in the memory module 210 (see FIG. 9) of the device 100; and provide an execution environment for a scripting language for coordinating operation of the application layers 400, 402, 404, 406 (see FIG. 10) of the client application programs 302.

Therefore, the native client terminal runtime environment 206 provides an interface for the client application programs 302 and to the device 100 functionality of a processor 208 and associated operating system of a device infrastructure 204. The runtime environment 206 preferably supplies a controlled, secure and stable environment on the device 100, in which the component application programs 302 execute. The runtime environment 206 provisions the definitions of the layers 400, 402, 404, 406 to create the actual web client.

Communication Device

Referring to FIGS. 1 and 2, the communication devices 100 are devices such as but not limited to mobile telephones, PDAs, two-way pagers and dual-mode communication devices (see FIG. 9). The devices 100 include a network connection interface such as a wireless transceiver 200 coupled via connection 218 to the device infrastructure 204. The wireless transceiver 200 is connectable during operation of the devices 100 to the network 102, 104, such as to the wireless network 102 by RF links, which enable the devices 100 to communicate with each other and with external systems (such as the web service 106) via the network 102, 104. The wireless transceiver 200 also helps the device 100 to coordinate the requests/response messages 105 between the client application programs 302 and the service 106. The network 102, 104 supports the transmission of data in the requests/response messages 105 between devices 100 and external systems, which are connected to the network 102, 104. The network 102, 104 may also support voice communication for telephone calls between the communication devices 100 and devices which are external to the network 102, 104. A wireless data transmission protocol can be used by the wireless network 102, such as but not limited to DataTAC, GPRS or CDMA. The connection between the wireless network 102 and the Internet 104 includes an Internet Gateway (not shown), which provides for the messages 105 and associated data content to flow between the connected devices 100 and the web service 106.

Referring again to FIG. 2, the devices 100 also have the user interface 202, coupled to the device infrastructure 204 by connection 222, to interact with a user (not shown). The user interface 202 can include one or more user input interface such as but not limited to a QWERTY keyboard, a keypad, a trackwheel, a stylus, a mouse, a microphone, and the user output interface such as an LCD screen display and/or a speaker. If the screen is touch sensitive, then the display can also be used as the user input device as controlled by the device infrastructure 204. The user interface 202 is employed by the user of the device 100 to coordinate the requests/response message messages 105 over the system 20 (see FIG. 1) as employed by client application programs 302 executed in the runtime environment 206.

Referring again to FIG. 2, operation of the communication device 100 is enabled by the device infrastructure 204. The device infrastructure 204 includes the computer processor 208 and the associated memory module 210. The computer processor 208 manipulates the operation of the network interface 200, the user interface 202 and the runtime environment 206 of the communication device 100 by executing related instructions, which are provided by an operating system and client application programs 302 located in the memory module 210. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Mediator Service 500

Figure 5:
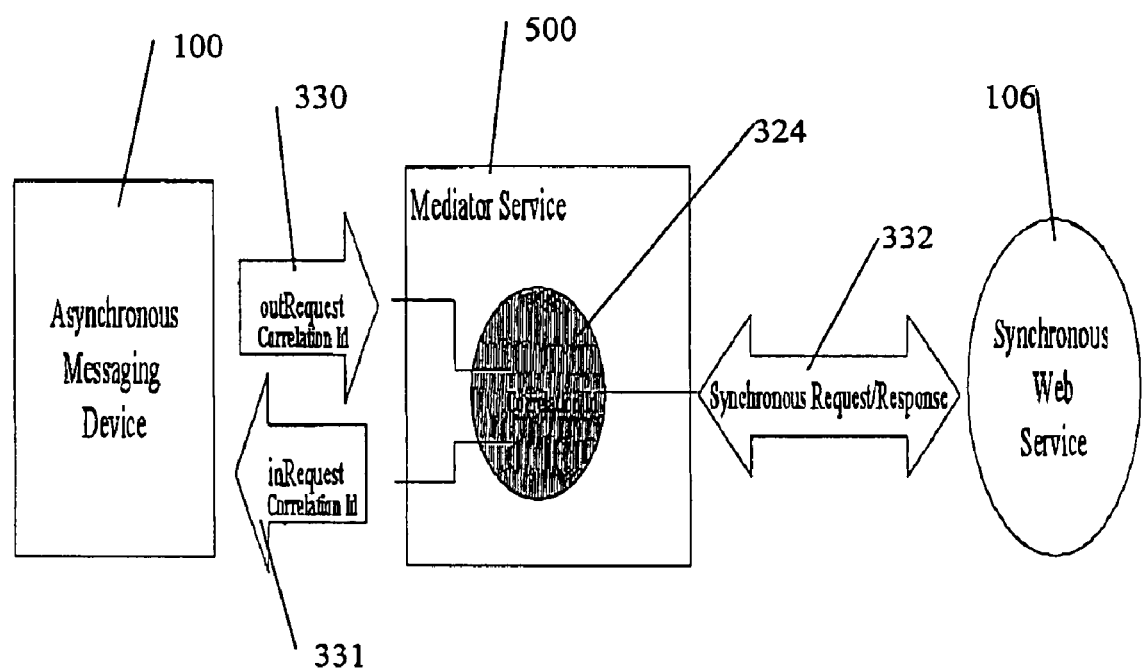
FIG. 5 shows a mediator service correlating asynchronous to synchronous messaging of the examples of FIGS. 3 and 4.

The desire to migrate towards an asynchronous messaging 105 paradigm in relation to the device 100 is further explained with reference to FIG. 5, by example only, wherein a message set 600 (see FIG. 6) is used to facilitate asynchronous communication between the device 100 and the synchronous web service 106. For situations in which the web service 106 is an asynchronous web service 106, the message set 600 (see FIG. 6) is also applicable, as further described below, wherein the device 100 may communicate directly with the asynchronous web service 106 preferably without the proxy function of the mediator 500. It is recognized that the mediator service 500 could be hosted: on the device 100 as either part of the application 302 or as a separate service/program; on a third party server, and/or on the web service 106, as desired.

Application Synchronous Message Set 600

Figure 6:
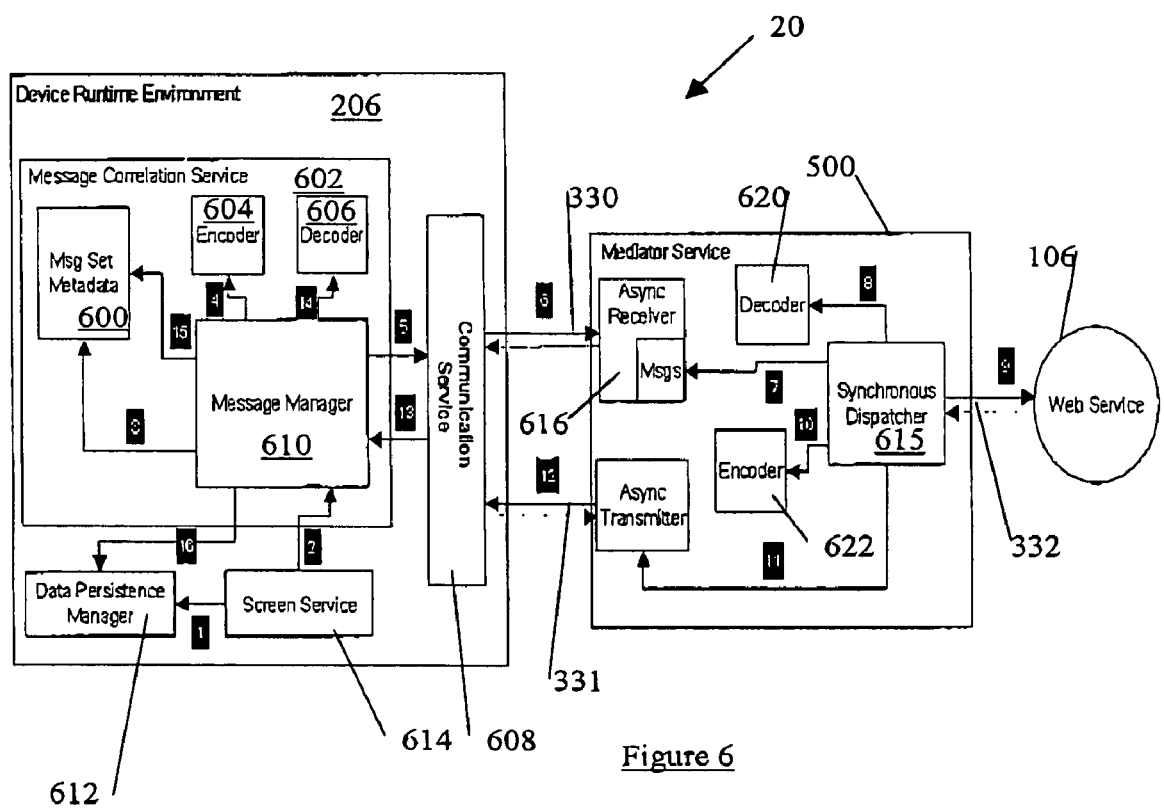
FIG. 6 shows an example configuration of the mediator service and runtime of FIGS. 1 and 5.

Referring to FIG. 6, the message set 600 can be defined as a data to message set that provides for a synchronous relation of otherwise uncorrelated (asynchronous) messages 330,331. It is recognized that the message set 600 can be described in a structured definition language (e.g. markup language) such as but not limited to XL. An example of the message set is the data elements 324a,b,c and 325a,b of the data definition 314 of FIG. 4. It is noted that the mediator service 500 can optionally proxy synchronous messaging 332 interaction with the web service 106 into the asynchronous exchange of messages 330,331 to the Device Runtime 206 of the device 100. The message Set 600 is a logical grouping of messages definitions 330,331 (see FIG. 4) of the message definition tier 404 and data elements 324a,b,c of the data tier 400 included for the outgoing asynchronous message 330 content and the data elements 325a,b included in the incoming asynchronous message 331 content. The data definition 314 of the data tier 400 states a correlation between otherwise unrelated asynchronous messages by defining the data 324a,b,c and 325a, as the message set 600. The message set 600 applies a restriction to the otherwise unrestricted asynchronous messaging 330, 331 paradigm.

For example, the message set can be further defined as: a single data element definition 314 to which messages 330,331 are correlated; one or more outgoing messages 330 that are derived from the data definition 314; and one or more incoming messages 331 that are applied to the data definition 314.

Figure 7:
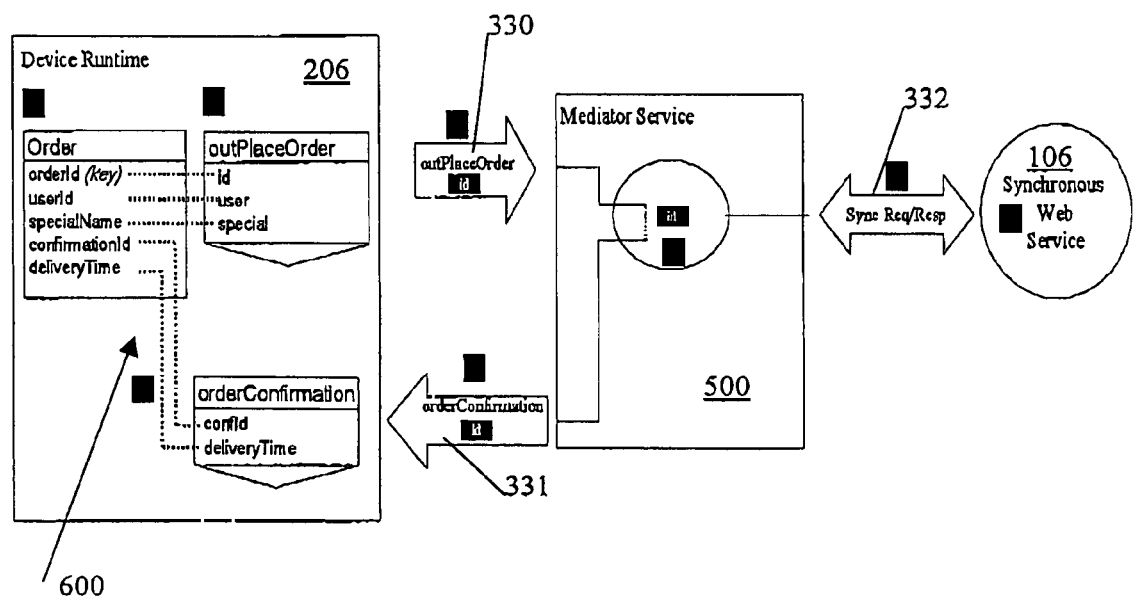
FIG. 7 is further embodiment the system of FIG. 5.

Referring to FIG. 7 for example, the problem of correlating a Pizza Shop order could be addressed by defining the Message Set 600 in FIG. 6, where the outPlaceOrder message 330 and orderConfirmation message 31 are correlated to the Order data definition 314 and clearly define how outgoing and incoming asynchronous messages 330,331 affect the underlying data elements as defined by the definition 314. The outPlaceOrder message 330 complies to the agreement of outgoing messages in the message set 600 by linking to the key field 324a of Order definition 314, i.e. outgoing message 330 definitions may be constrained in that they provide a linkage 440 (see FIG. 4) to the key element 324a of the data definition 314. This may arise due to Message Mapping or Field Mapping, as described above. The orderConfirmation incoming message 331 conforms to the incoming message requirement of the message set 600 for example by not linking to any key field 324a of the Order data definition 314, rather containing an identifier field 325a that is also part of the message set 600, i.e. incoming message 331 definitions specify Field Mapping 442 directions to the Message Set 600 enclosed by the data element definition 314. Incoming message 331 definitions may be constrained in that they cannot employ Message Mapping 440, and for example no Field Mapping 442 may reference the key field element 324a of the data definition 314.

It is further emphasized in relation to FIG. 7 that the Mediator Service 500 may act as a proxy to the device runtime 206 asynchronous messaging 330,331 so as to assist the device 100 to interact asynchronously with a synchronous message 332 based web service 106. However, the Mediator Service may or may not be present between the device 100 and the web service 106 in cases where the web service is asynchronous based and has knowledge of the message set definitions 600. A further scenario is that the mediator service 500 is present between the device 100 and the web service 106 and has knowledge of the message set 600 definitions and can therefore either interact with the web service 106 in a synchronous fashion or asynchronously as dictated by the configuration of the web service 106. The Mediator Service 500, where used, is able to maintain correlation information of the message set 600 between the incoming device message 330 (i.e. in essence the outgoing request to the web service 106) and the outgoing device message 331 (in essence the response by the web service 106). It is further recognized that where used, the mediator service 500 can be part of the device 100, part of the web service 106, and/or configured as a third party proxy.

Message Set Components

Referring to FIG. 6, in this system 20, the management of correlation of asynchronous messages 330,331 can be split between the intelligent Device Runtime 206 and the Mediator service 500 using the message set definitions 600. The larger part of this management burden can be borne by the device framework 206. The Device Runtime 206 is primarily responsible for managing the Message Set 600 and relationships, and correlating received messages 331 to prior originating messages 330. The Mediator Service 500, for example, splits the web service 106 request into the asynchronous exchange of messages 330,331 with the device 10, if needed, and associates the correlation information of the message set 600 between related messages 330,331.

Device Runtime Modules

The runtime environment 206 can have a Message Correlation Service 602 responsible for enforcing the rules of the Message Set 600, correlating outgoing asynchronous messages 330 to incoming asynchronous messages 331 to a single mapped data instance as per the data definitions 314 of the message set 600. Subsystems of the service 602 can include a message Decoder 604 for converting Communication Service 608 message protocol (i.e. for incoming messages 331) into internal operable message format of the device 100 where needed, an Encoder 606 for converting internal message representation of the device 100 into format required to support protocol of the Communication Service 608 (i.e. for outgoing messages 330), and the Message Manager 610 for performing the correlation of messages 330,331 to a data instance as used by the application 302 and utilizes a message envelope of the messages 330,331 to carry the correlation Id 324a. The runtime environment 206 can also have a Data Persistence Manager 612 that persists and provides access to all instances of Data components 400 defined by the application 302. The Persistence Manager 612 permits resolution of a data instance by a key field data value 324a. It is recognised that the data instances mentioned are instantiated versions of the data definition 314 as utilised by the device 100 during operation of the application 302 as a result of direct or indirect interaction with the web service 106. A UI Service 614 provides interaction with the user of the device interface 202 (see FIG. 2) via visualization of screen definitions 404 (of the application 302), knows when a user action corresponds to changes in underlying data, and knows when a particular user action results in interaction with the associated web service (e.g. sends the message 330). It is also recognised that the Communication Service 608 can provide an over the air (OTA) interface of the device 100.

For example, one scenario is for the Communication Service 608 to use a synchronous mechanism to transmit messages 330,331 to the Mediator Service 500 or the web service 106 directly (not shown), and can offer a synchronous listener interface for arriving messages from the mediator 500 or web service 106. As such the Communication Service 608 can provide a device facing asynchronous messaging mechanism to device applications 302, i.e. provide synchronous messaging 330,331 between the mediator 500 or web service 106 while providing asynchronous messaging internally of the device 100 with the message manager 610. A second scenario is for the communication service 608 to act as a simple messaging network 20 interface for the device 100 and therefore transfer asynchronous messages 330,331 outgoing and incoming with respect to the device 100.

Mediator Service Modules

When utilized as a proxy between asynchronous and synchronous environments, the mediator service 500 can have a Synchronous Dispatcher module 614 for performing the messaging 332 interaction with the synchronous web service 106. The Synchronous Dispatcher 614 maintains the correlationId 324a between the arriving device message 330 and the departing device message 331. The Synchronous Dispatcher 614 is able to detect when the message 330 has arrived and is sitting at an Async Receiver 616, which receives and queues arriving device message 330 envelopes. On receipt of the message 330, the receiver 616 releases the connection (i.e. returns immediately to the device 100). As well, The Synchronous Dispatcher 615 is able to detect when the message 332 has arrived from the web service 106 and forwards the appropriate message 331 to an Async transmitter 618, which initiates the outgoing connection to the device 100, passes the outgoing message 331 envelope with correlation Id 325a as received from the web service 106. Finally, an optional Decoder 620 for transforming the incoming device message 330 into an internal operable format that can be utilized by the Synchronous Dispatcher 615 for submission to the webservice 106, and an optional Encoder 622 for transforming the web service 106 result data (e.g. data element 325b) into the outgoing device message 331 from an internal operable format.

Message Set and Mediator Service Operation

This section describes the interactions between the device runtime 206 and the web service 106 to satisfy asynchronous messaging in the context of a Pizza Shop order process example. Referring to FIG. 6, the following steps can be performed such as but not limited to:

1. In response to user interaction with a screen of the user interface 202, the Screen Service 614 updates a data element associated to the screen, i.e. the device Runtime generates the Order data element based the interaction with the application 302 user;
2. The Screen Service 614 detects via application metadata of the message set 600 that a rule indicating that the message 330 is sent on update of this data item. The Screen Service 614 requests the Message Manager 610 to send the appropriate message 330, and supplies the data instance (e.g. data definition 314) required to allow message creation;
3. The Message Manager 610 examines the Message Set 600 definitions of the application 302, and determines that the message 330 requested in 1 is part of the Message Set 600. The key field 324a of mapped data is determined from the message set 600 definition (e.g. link 440—see FIG. 4) and this value is reserved as the correlationId 324a;
4. The Message Manager 610 passes the data instance and outgoing message metadata definition 600 to the Encoder module 604. The Encoder module 604 takes the internal metadata representation of the message 330, and the provided values, and generates the message 330 supporting the protocol of the Communication Service 608, such that the device Runtime 206 generates the outPlaceOrder message 330 from the Order data definitions 314 using mapping instructions in the Message Set 600. The outPlaceOrder message can contain the id 324a, user 324b and special 324c fields derived from the Order orderId, userId and specialName fields of the data definition 314 as specified in the message set 600. The Device Runtime 206 detects that the orderId 324a represents the key field of the data element representing the data definition 314 and includes a token in the outPlaceOrder message 330 envelope that distinguishes this field as the correlation id 324a;
5. The Message Manager 610 adds the correlationId 324a to the envelope of the encoded message 330 request. The entire envelope is passed to the Communication Service 608 for delivery to the Mediator Service 500, if used, otherwise directly to the web service 106;
6. The Communication Service 608 initiates a connection to the Mediator Service Async Receiver 616 (or directly to the web service 106) and passes the message 330. The Async Receiver 616, if used, returns immediately to the Communication Service 608. Accordingly, the Device Runtime 206 transmits the outPlaceOrder message 330 to the Mediator Service 500, if used, which detects the correlation id 324a of the message 330;

Where Mediator Synchronous Request Handling is Used

7. The Mediator Service Synchronous Dispatcher 615 detects that the message 330 has arrived from the device 100. The message 330 is picked up from the Async Receiver 616;
8. The Synchronous Dispatcher 615 obtains the correlationId 324a from the message 330 envelope and passes the message 330 data to the Decoder 620 to obtain the message content;
9. The Synchronous Dispatcher 615 initiates a synchronous request 332, for example, to the web service 106 with the data obtained in step 8. The Mediator Service 500 initiates the synchronous request 332 to the web service 106 using the outPlaceOrder parameters 324a, b,c, where the field 324b can identify the user and/or device 100 and/or application 302 originating the message 330. The field 324c can be a data value sent to the web service 106 as generated by the application 302. The web service 106 processes the information 324a,b,c of the message 330 and immediately returns a result 325a,b. The web service response 332 is returned in the same cycle as the request 332;

10. The Synchronous Dispatcher 615 passes the response data to the Encoder 622 to produce the required device response message 331. The Synchronous Dispatcher 615 adds the correlationId 325a to the envelope of the message 331 in response to the data received from the web service 106. The Mediator Service 500 therefore obtains the result 325a,b and generates the orderConfirmation message 331. The correlation id 325a is embedded in the envelope of the orderConfirmation message 330 as well as any data 325b (e.g. an update to the data element deliverytime of the data definition 314. The Mediator Service 500 transmits the message 331 asynchronously/synchronously to the Device Runtime 206; and 11. The message 331 is passed to the Async Transmitter 618 which . . . .

12. Calls the device 100 passing the message 331. The device 100 returns to the Mediator service 500 immediately.

It is recognised that in the above given mediator example that the web service could be substituted in the mediator's 500 stead, where the web service 106 would be responsible for placing the id 325a in the message 331 as per the expected shared definitions of the message set 600. At the device 100, further steps:

Device 100 Asynchronous Message Reception and Handling

13. The device Communication Service 608 passes the received message 331 to the Message Manager 610. The Message Manager 610 obtains the correlationId 325a from the envelope of the message 331;

14. The Message Manager 610 passes the message 331 to the Decoder 606 which converts the message 331 into an internal operable representation if needed;

15. The Message Manager 610 queries the Message Set 600 definitions and determines that the received message 331 belongs to a particular set as per the id 325a. The Message Manager 610 determines the Data instance to which incoming messages apply. The Device Runtime 206 receives the orderConfirmation message 330 and detects that this message is part of the Pizza Order message set 600; and 16. The Message Manager 610 resolves the data instance using the correlationId 325a as the id value, and updates the data instance according to mapping rules described in the Message Set 600. It extracts the correlation id 325a, resolves the underlying data element (Order) in view of field element 325b and applies the orderConfirmation mappings to this instance.

Application Program 302

Figure 8:
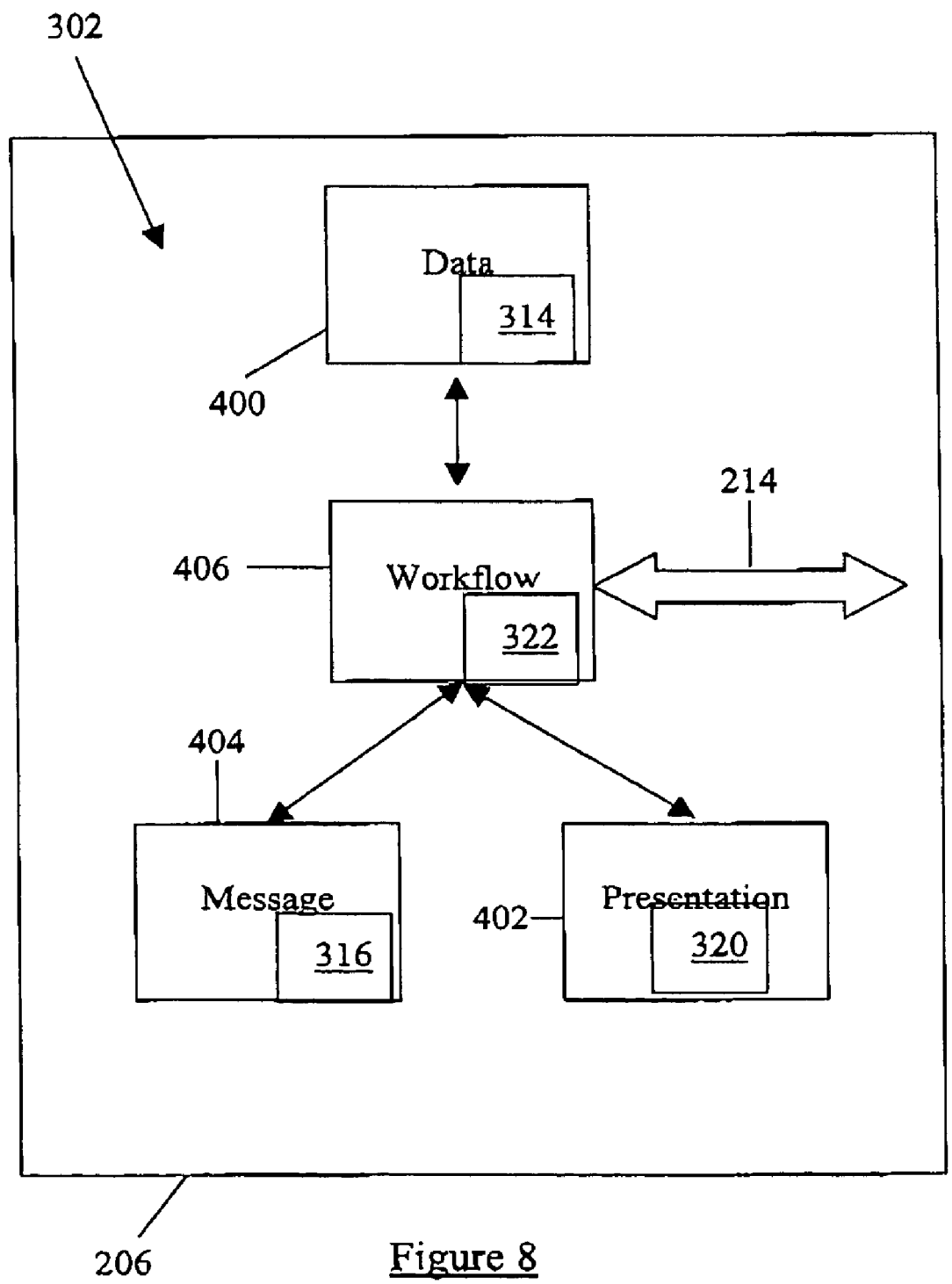
FIG. 8 is a block diagram of a component application program of FIG. 9.

Referring to FIG. 8, a block diagram of the component application program 302 comprises the data layer 400, the presentation layer 402 and the message layer 404, which are coordinated by workflow layer 406 through communications 214 with the client runtime environment 206. The structured definition language can be used to construct the definitions 314,316,320 of the layers 400, 402, 404 as a series of metadata records, which consist of a number of pre-defined elements representing specific attributes of a resource such that each element can have one or more values. Each metadata schema typically has defined characteristics such as but not limited to: a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the layers 400, 402, 404 to be processed by the device infrastructure 204 (see FIG. 2), and encoding schemes include such as but not limited to XML, HTML, XHTML, XSML, RDF, Machine Readable Cataloging (MARC), and Multipurpose Internet Mail Extensions (MME). The client runtime environment 206 can operate on the metadata descriptors of the layers 400, 402, 404 to provision an executable version of the application program 302. It is recognised that the layers 402 and 406 can be provided by other means for the application 302, such as but not limited to native code and other defined execution languages. The application 302 can make use of the data 400 and message 404 layers to implement mappings 318 (see FIG. 3) between fields of the definitions 314,316,320 to help correlate asynchronous messaging 105 between the device 100 and the web service 106.

Referring again to FIG. 8, the data layer 400 defines data entities (definitions 314) which are used by the application program 302. Examples of data entities which the data layer 400 may describe are orders, users, and financial transactions. The Data layer 400 defines what information is required to describe the data entities, and in what format the information is expressed. For example, the data layer 400 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definitions 314 of the data layer 400.

Referring again to FIG. 8, the message layer 404 defines the format of messages 105 used by the application program 302 to communicate with external systems such as the web service 106. For example, one of the message definitions 316 may describe such as but not limited to a message for placing an order which includes the unique identifier for the order, the status of the order, and notes associated with the order.

It is noted that the use of layers 402 and 406 may be optional for the application 302.

Referring again to FIG. 8, the optional presentation layer 402 defines the appearance and behavior of the application program 302 as it displayed by the user interface 202. The presentation layer 402 can specify GUI screens and controls, and actions to be executed when the user interacts with the application 302 using the user interface 202. For example, the presentation definitions 320 my define screens, labels, edit boxes, buttons and menus, and actions to be taken when the user types in an edit box or pushes a button. The majority of Web Service 106 consumers use a visual presentation of Web Service 106 operation results, and therefore provide the runtime environment 206 on their devices 100 capable of displaying user interface screens.

Referring to FIGS. 1 and 8, it is recognized that in the above described client application program 302 definitions hosting model, the presentation layer 402 may vary depending on the client platform and environment of the device 100. For example, in some cases Web Service consumers do not require a visual presentation. The application definitions 314, 316,320,322 of the application program 302 can be hosted in a Web Service registry as a bundle of platform-neutral data 400, message 404, workflow 406 layer descriptors with a set of platform-specific presentation layer 402 descriptors for various predefined client runtimes 206 (see FIG. 2). When the discovery or deployment request message 105 is issued the client type should be specified as a part of this request message 105. In order not to duplicate data, message, and workflow metadata while packaging application programs 302 for different client platforms of the communication devices 100, application definitions 314,316,320,322 can be hosted on the web service 106 (for example) as a bundle of platform-neutral component definitions 314,316,322 linked with different sets of presentation definitions 320. When a user makes a discovery or download request message 105, the client runtime type of the communication devices 100 is validated and the proper bundle is constructed for delivery by the web service 106 to the device 100 over the network 102, 104. For those Web Service 106 consumers, the client application programs 302 would contain the presentation layer 402 linked with the data 400 and message 404 layers through the workflow layer 406. It is recognized that the hosting model includes message 404 and data 400 layers with the remainder of the application functionality (presentation and workflow) expressed in a manner that cooperates with these defined layers 400, 404, such as but not limited to native code and other defined components as desired.

Referring again to FIG. 8, the optional workflow layer 406 of the application program 302 defines processing that occurs when an action is to be performed, such as an action specified by a presentation layer 402 as described above, or an action to be performed when messages 105 (see FIG. 1) arrive from the system 20. Presentation, workflow and message processing are defined by the workflow layer 406. The workflow layer 406 can be written as a series of instructions in a programming language or a scripting language, such as but not limited to ECMAScript, and can be compiled into native code and executed by the runtime environment 206, as described above. An example of the workflow layer 406 content may be to assign values to data, manipulate screens, or send the message 105. As with presentation layer 402, multiple workflow definitions 322 can be created to support capabilities and features that vary among devices 100. The appropriate workflow definition can be determined and sent at the time of downloading and provisioning of the application program 302.

ECMA (European Computer Manufacturers Association) Script is a standard script language, wherein scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the facilities of an existing system, such as the devices 100. In such systems, useful functionality is already available through the user interface 202 (see FIG. 2), and the scripting language is a mechanism for exposing that functionality to program control. In this way, the device 100 is said to provide a host runtime environment of objects and facilities which completes the capabilities of the scripting language.

Specifically, EMCAScript is an object-oriented programming language for performing computations and manipulating computational objects within the host runtime environment. ECMAScript can be used as a Web scripting language, providing a mechanism to perform service 106 computation as part of the Web-based client-server architecture of the system 20 (see FIG. 2). ECMAScript provides core scripting capabilities for a variety of host runtime environments, and therefore the core scripting language can be considered platform neutral for a number of particular host runtime environments. The runtime environment 206 (see FIG. 2) can provide the ECMAScript host runtime environment for client-side computation of the communication devices 100, such as but not limited to: objects that represent windows, menus, pop-ups, dialog boxes, text areas, anchors, frames, history, cookies, and input/output. Further, the host runtime environment of the runtime environment 206 provides a means to attach scripting code to events such as but not limited to change of focus, page and image loading, unloading, error, and abort, selection, form submission, and mouse actions. In implementations using ECMA scripting, the code appears within the workflow layer 406, combines user interface elements and fixed and computed text and images, and is reactive to user interaction on the user interface 202. The web service 106 (see FIG. 1) provides a different host environment for server-side computation including objects representing requests, clients, and files, and mechanisms to lock and share data. By using the client side and server side scripting together, it is possible to distribute computation between the client communication devices 100 and the service 106 while providing a customized user interface 202 for the Web-based application programs 302.

ECMAScript also defines a set of built-in operators which may not be, strictly speaking, functions or methods. ECMAScript operators include such as but not limited to various unary operations, multiplicative operators, additive operators, bitwise shift operators, relational operators, equality operators, binary bitwise operators, binary logical operators, assignment operators, and the comma operator. ECMAScript syntax resembles Java syntax, however, ECMAScript syntax is relaxed to enable it to serve as an easy-to-use scripting language for developers. For example, a variable in ECMAScript is not required to have its type declared nor are types associated with properties, and defined functions are not required to have their declarations appear textually before calls to them. It is recognized that in a class-based object-oriented programming language, in general, state is carried by instances, methods are carried by classes, and inheritance is only of structure and behavior. In ECMAScript, the state and methods are carried by objects, and structure, behavior, and state are all inherited.

Application Program 302 Example

Accordingly, referring to FIG. 8, the client application programs 302 can be defined as a set of platform-neutral component definitions 314,316, namely for data 400 and message 404 layers, and the optional presentation layer 402 using XML (or any other suitable structured definition language). The optional workflow layer 406 can be defined using ECMAScript (or any other suitable platform-neutral scripting language). The client runtime environment 206 (see FIG. 2) can generate component templates based on meta-definitions when the definitions 314,316,320,322 of the application program 302 are provisioned on the communication device 100. With a large variety of terminal runtime environments 206, the cross-platform standards such as XML or ECMAScript can be used to define application component metadata instead of pre-building the application programs 302. This delayed binding can allow the generic application definitions of the component application programs 302 to be run on a wide variety of terminal system environments 206, represented by various different communication devices 100.

The following example shows how a Web Services client application program 302 could be expressed using a structured definition language, such as but not limited to XML, and a platform neutral scripting/programming language, such as but not limited to ECMAScript, with defined components conforming with the following Document Type Definition (DTD):

```
<!ELEMENT wcApp (desc?, iconUrl?, res*, wcData*, wcMsg*,
style*, wcScr*, wcFlow)>
<!ATTLIST wcApp
    name CDATA #REQUIRED
    title CDATA #IMPLIED
    vendor CDATA #IMPLIED
    version CDATA #IMPLIED
    transportKey CDATA #IMPLIED
    installNotifURL CDATA #IMPLIED
    registerURL CDATA #IMPLIED
>
<!ELEMENT desc (#PCDATA)>
<!ELEMENT iconUrl (#PCDATA)>
<!ELEMENT res (#PCDATA)>
<!ATTLIST res
    name CDATA #REQUIRED
    url CDATA #REQUIRED
    type (xml | image | sound | any) #REQUIRED
    deferred (true | false) "false"
>
Example Data definitions 314
<!ELEMENT wcData (dfield+)>
<!ATTLIST wcData
    name CDATA #REQUIRED
    persisted (true | false) "true"
>
<!ELEMENT dfield (#PCDATA)>
<!ATTLIST dfield
    name CDATA #REQUIRED
    type (String | Number | Boolean | Date | Any) "Any"
    array (true | false) "false"
    cmp (true | false) "false"
    cmpName CDATA #IMPLIED
    key (0 | 1 | 2) "0"
>
Example Message definitions 316
<!ELEMENT wcMsg (mfield*)>
<!ATTLIST wcMsg
    name CDATA #REQUIRED
    mapping CDATA #IMPLIED
>
<!ATTLIST wcMsg
    pblock CDATA #IMPLIED
>
<!ELEMENT mfield (#PCDATA)>
<!ATTLIST mfield
    name CDATA #REQUIRED
    type (String | Number | Boolean | Date | Array |
        XML) #IMPLIED
    mapping CDATA #IMPLIED
>
Example Presentation definitions 320
<!ELEMENT wcScr (layout?, menu?, refresh?, event?)>
<!ATTLIST wcScr
    name CDATA #REQUIRED
    title CDATA #IMPLIED
    main (true | false) "false"
    dialog (true | false) "false"
    param CDATA #IMPLIED
>
<!ELEMENT style (font?)>
<!ATTLIST style
    name CDATA #REQUIRED
    bgColor CDATA #IMPLIED
>
<!ELEMENT font EMPTY>
<!ATTLIST font
    name CDATA #REQUIRED
    color CDATA #IMPLIED
    size CDATA #IMPLIED
    bold (true | false) "false"
    italic (true | false) "false"
    underline (true | false) "false"
>
<!ELEMENT refresh (msg+)>
<!ELEMENT msg (#PCDATA)>
<!ELEMENT layout (layout*, label*, separator*, edit*, image*,
choice*, button*, textarea*)>
<!ATTLIST layout
    type (grid | flow | border | vertical) #REQUIRED
    param CDATA #IMPLIED
    placement CDATA #IMPLIED
    style CDATA #IMPLIED
>
<!ELEMENT menu (item*)>
<!ELEMENT item (action, condition?)>
<!ATTLIST item
    name CDATA #REQUIRED
    label CDATA #REQUIRED
    shortcut CDATA #IMPLIED
>
<!ELEMENT action EMPTY>
<!ATTLIST action
    screen CDATA #IMPLIED
    pblock CDATA #IMPLIED
    param CDATA #IMPLIED
    acceptChanges (true | false) "true"
>
<!ELEMENT condition EMPTY>
<!ATTLIST condition
    pblock CDATA #REQUIRED
    param CDATA #IMPLIED
    result (true | false) "true"
>
<!ELEMENT event EMPTY>
<!ATTLIST event
    type (onInit | onClick | onChange | onFocusOut) "onInit"
    pblock CDATA #IMPLIED
    screen CDATA #IMPLIED
    param CDATA #IMPLIED
>
<!ELEMENT separator EMPTY>
<!ELEMENT label (condition?, event?)>
<!ATTLIST label
    name CDATA #REQUIRED
    value CDATA #REQUIRED
    placement CDATA #IMPLIED
    style CDATA #IMPLIED
>
<!ELEMENT edit (condition?, event?)>
<!ATTLIST edit
    name CDATA #REQUIRED
    value CDATA #IMPLIED
    mapping CDATA #IMPLIED
    type (char | number | date | pwd | phone | email) "char"
    readOnly (true | false) "false"
    placement CDATA #IMPLIED
    style CDATA #IMPLIED
>
<!ELEMENT textarea (condition?, event?)>
<!ATTLIST textarea
    name CDATA #REQUIRED
    value CDATA #IMPLIED
    mapping CDATA #IMPLIED
    readOnly (true | false) "false"
    placement CDATA #IMPLIED
    style CDATA #IMPLIED
>
<!ELEMENT image (condition?, event?)>
<!ATTLIST image
    name CDATA #REQUIRED
    resName CDATA #REQUIRED
    placement CDATA #IMPLIED
>
<!ELEMENT choice (condition?, event?, entry*)>
<!ATTLIST choice
    name CDATA #REQUIRED
    value CDATA #IMPLIED
    mapping CDATA #IMPLIED
    type (singleList | multiList | dropdown | checkbox |
        radio) "singleList"
```

-continued

```
        readOnly (true | false) "false"
        placement CDATA #IMPLIED
        style CDATA #IMPLIED
>
<!ELEMENT entry (#PCDATA)>
<!ELEMENT button (condition?, event?)>
<!ATTLIST button
        name CDATA #REQUIRED
        label CDATA #REQUIRED
        image (true | false) "false"
        placement CDATA #IMPLIED
        style CDATA #IMPLIED
>
Example Workflow definitions 322
<!ELEMENT wcFlow (pblock+)>
<!ELEMENT pblock (#PCDATA)>
<!ATTLIST pblock
        id CDATA #REQUIRED
        param CDATA #IMPLIED
>
```

As given above, the XML elements define the example component application 302 including a wcApp element, a wcData element, a wcMsg element, a wcSrc element, and a wcFlow element. Referring to FIG. 8, the wcApp element is a top-level element which defines the application program 302. The wcData element defines the example data layer 400, which is comprised of a group of named, typed fields. The wcMsg element defines the example message layer 404, which similarly defines a group of named, typed fields. The wcSrc element defines the example presentation layer 402. The example presentation layer 402 is a label, a separator, an image, a button, an edit field, a text area, a single-selection list, a multi-selection list, a drop-list, a checkbox, a radio button, or a screen containing a group of other presentation definitions 320.

Referring to the above example component application program 302 and FIG. 8, the wcFlow element defines the example workflow layer 406. The pblock attributes of the XML elements specify a pblock element nested in the wcFlow element. Each pblock element comprises script which defines part of the workflow of the application program 302. The script is written in ECMAScript. In order to define the behavior of the application 302, the optional workflow layer 406 uses ECMAScript to reference and manipulate the data layer 400, the presentation layer 402, and the message layer 404. The workflow layer 406 can also reference external object types, which allow actions to be performed on the components defined in the application 302. For example, a wcMsg type allows a message defined by a message definition 316 to be evaluated to determine whether mandatory fields have been supplied, and to be sent to an external system such as the web service 106. A wcData type allows the size of collections of data entities defined by data definition 314 to be determined, and allows data entities to be deleted. A wcScr type allows a presentation definition 320 to be displayed to the user. Similarly, a special dialog external object allows a message to be displayed to the user on the user interface 202 (see FIG. 2).

We claim:

1. A system for correlating asynchronous communication messages between a mobile communication device and a data source over a network, the mobile communication device for executing an application to provide interaction with the data source based on content of the communication messages, the system comprising:

a memory module having stored thereon a message set configured to correlate an asynchronous request message of the communication messages with a corresponding asynchronous response message of the communication messages, the asynchronous request message including a first correlation identifier when transmitted and the asynchronous response message including a second correlation identifier when received, the first correlation identifier being different from the second correlation identifier, the first and second correlation identifiers forming part of the message set and specifying a mapping that correlates a data element of the asynchronous request message and a data element of the asynchronous response message, respectively, with a data instance; and a processor communicatively coupled to the memory module and configured to execute a message manager, wherein the message manager is configured to map the data element of the asynchronous response message to an element of the data instance using the second correlation identifier and by updating the element of the data instance with the data element of the asynchronous response message according to the mapping specified in the message set.

2. The system of claim 1 wherein the message manager is further configured to map the element of the data instance to the data element of the asynchronous request message by updating the data element of the asynchronous request message with the element of the data instance according to the mapping specified in the message set.

3. The system of claim 2, wherein the first correlation identifier is configured for insertion in the asynchronous request message by the mobile device and the second correlation identifier is configured for insertion in the asynchronous response message by the data source.

4. The system of claim 3 further comprising a screen service for initiating the message request based on a user data event from a user interface of the device.

5. The system of claim 3, wherein the message set is described in a structured definition language.

6. The system of claim 4, wherein the message manager is configured for querying the message set to determine if the data corresponding to the user event is defined by the message set as a data element of the asynchronous response message.

7. The system of claim 4 further comprising a persistence manager for resolving the data instance according to the first correlation identifier.

8. The system of claim 2 further comprising a communication service for interfacing between the message manager and the network.

9. The system of claim 8, wherein the communication service is configured to provide communication of the messages between the communication service and the message manager asynchronously.

10. The system of claim 9, wherein the communication service is configured to provide communication of the messages between the communication service and the network asynchronously.

11. A method for correlating asynchronous communication messages between a mobile communication device and a data source over a network, the mobile communication device for executing an application to provide interaction with the data source based on content of the communication messages, the method comprising:

sending an asynchronous request message of the communication messages, the asynchronous request message including a first correlation identifier when transmitted;

receiving an asynchronous response message of the communication messages, the asynchronous response message including a second correlation identifier when received, the first correlation identifier being different from the second correlation identifier;

correlating the asynchronous request message with the asynchronous response message by employing a message set, the first and second correlation identifiers forming part of the message set and specifying a mapping that correlates a data element of the asynchronous request message and a data element of the asynchronous response message, respectively, with a data instance; and mapping the data element of the asynchronous response message to an element of the data instance using the second correlation identifier and by updating the element of the data instance with the data element of the asynchronous response message according to the mapping specified in the message set.

12. The method of claim 11 further comprising mapping the element of the data instance to the data element of the asynchronous request message by updating the data element of the asynchronous request message with the element of the data instance according to the mapping specified in the message set.

13. The method of claim 12, wherein the first correlation identifier is configured for insertion in the asynchronous request message by the mobile device and the second correlation identifier is configured for insertion in the asynchronous response message by the data source.

14. The method of claim 13 further comprising initiating the message request based on a user data event from a user interface of the device.

15. The method of claim 13, wherein the message set is described in a structured definition language.

16. The method of claim 14 further comprising querying the message set to determine if the data corresponding to the user event is defined by the message set as a data element of the asynchronous response message.

17. The method of claim 14 further comprising resolving the data instance according to the first correlation identifier.

18. The method of claim 12 further comprising providing a communication service for interfacing between a message manager and the network.

19. The method of claim 18, wherein the communication service is configured to provide communication of the messages between the communication service and the message manager asynchronously.

20. The method of claim 19, wherein the communication service is configured to provide communication of the messages between the communication service and the network asynchronously.

21. A non-transitory computer readable medium storing a computer program for correlating asynchronous communication messages between a mobile communication device and a data source over a network, the mobile communication device for executing an application to provide interaction with the data source based on content of the communication messages, the computer readable medium comprising:

a message set module stored on the medium and configured to correlate an asynchronous request message of the communication messages with a corresponding asynchronous response message of the communication messages, the asynchronous request message including a first correlation identifier when transmitted and the asynchronous response message including a second correlation identifier when received, the first correlation identifier being different from the second correlation identifier, the first and second correlation identifiers forming part of the message set module and specifying a mapping that correlates a data element of the asynchronous request message and a data element of the asynchronous response message, respectively, with a data instance; and a message manager module stored on the medium and configured to map the data element of the asynchronous response message to an element of the data instance using the second correlation identifier and by updating the element of the data instance with the data element of the asynchronous response message according to the mapping specified in the message set module.

* * * * *